Aug. 14, 1956

E. M. LAUCK 2,758,536

AUTOMATIC DENSITY CONTROL FOR COMPRESSING APPARATUS

Filed June 7, 1952

ERNEST M. LAUCK
INVENTOR

HUEBNER, BEEHLER,
WORREL & HERZIG
ATTORNEYS

BY Richard M. Worrel

Aug. 14, 1956  E. M. LAUCK  2,758,536
AUTOMATIC DENSITY CONTROL FOR COMPRESSING APPARATUS
Filed June 7, 1952  2 Sheets-Sheet 2

ERNEST M. LAUCK
INVENTOR

HUEBNER, BEEHLER,
WORREL & HERZIG
ATTORNEYS

United States Patent Office 2,758,536
Patented Aug. 14, 1956

2,758,536

AUTOMATIC DENSITY CONTROL FOR COMPRESSING APPARATUS

Ernest M. Lauck, Fresno, Calif.

Application June 7, 1952, Serial No. 292,252

10 Claims. (Cl. 100—43)

The present invention relates to compressing and/or baling apparatus and more particularly to an improved mechanism for automatically controlling the extent of compression and resultant density of compressed materials processed in such apparatus.

The subject invention constitutes an improvement in the "Density control for hay presses" shown and described in my copending patent application, Serial No. 114,261, filed September 7, 1949 now Patent No. 2,708,872. Although many apparatus intended to control hay density had been developed prior to the "Density control for hay presses" comprising the subject matter of the identified copending application, conventional practice prior to said invention was largely restricted to operator estimate of existing hay conditions and manual adjustment of the balers to achieve desired density. Inasmuch as baling conditions constantly vary, due to varying moisture content and quality of the material baled at succeeding locations, manual error causes the formation of faulty bales, bales of widely differing weights, and imposes undue stresses and strains upon baling mechanisms.

Various density detecting means had been proposed to obviate the necessity of employing an operator to evaluate hay conditions and adjust baling apparatus without success.

For example, it has been known to detect density of baled hay and the like by thrusting a feeler head into the compressed hay and promptly retracting the same. This compression detection was subject to all of the inaccuracies of generalization on the basis of intermittent sampling. When such feeler heads struck heavy stalks, weeds, stems, or sticks in the hay, an entirely erroneous impression of the hay density was formulated, and where automatic density control was effected from such sampling, errors of great magnitude resulted. Pronged wheels, star wheels, and the like rotated in engagement with compressed hay and resiliently urged theretoward were also proposed but were subject to the same errors as those generally described for the reciprocated feeler heads. The "Density control for hay presses" minimized these difficulties by the ultilization of an elongated blade having a sharpened edge adapted to ride in hay or other material being compressed and, because of its length and cutting effect, to achieve an averaging detection of hay compression so that the errors incident to spot detection were obviated. Although superior to spot detection systems and those utilizing star wheels for detection purposes, the "Density control for hay presses" was subject to certain less significant, but nevertheless objectionable difficulties which the instant invention has overcome.

In ramming successive charges of hay or other compressible material into a baler, the compressed material is subjected to pulses of pressure of maximum force during the ramming and of minimum force intermediate successive ramming actions. Thus, as frequently as additional charges of hay or the like are rammed, the detection means tend to move from such material and to travel more deeply into the material intermediate the charges. The resultant pulse movement of the detection means exercises a continuing, unnecessary, and frequently objectionable modification of the adjustment of a density control mechanism operably connected thereto.

As pointed out in the preceding application, vacuum actuation of the "Density control for hay presses" has proved preferable to other types of actuation systems. Inasmuch as there is only a limited amount of vacuum power available in hay balers and the like, the continuous readjustment of a density control mechanism by such vacuum power dissipates so much of the power that an inadequate supply thereof is available for continuous operation.

An object of the present invention is therefore to provide in a density control apparatus of the character described for improved averaging detection of the density of compression so that continuous unnecessary and objectionable readjustment of density control means is avoided.

Another object is to provide an improved hay baler in which the density of bales formed thereby is substantially uniform.

Another object is to provide a control for a baler adapted automatically and continuously to adjust the baler to varied hay quality, moisture content, and the like, while obviating adjustment incident to the pulse compression of successive charges of hay.

Another object is to provide a baler in which the cost of the baling operation is reduced and bales of improved uniformity achieved.

Another object is to provide a baler in which the density of a bale of hay being formed is regulated to conform to a predetermined standard by continuous detection of the degree of hay compression of hay rammed into the bale.

Another object is to provide a baler in which compression plates are utilized to resist discharge of bales therefrom against which successive bales are rammed which are positively and automatically positioned to offer substantially constant resistance to discharge.

Another object is to provide an improved baling control of the character described that is economical to manufacture, simple to install on existing or newly produced balers, durable in design and construction, dependable in its operation, and adapted to regulate bale uniformity in an efficacious manner.

Further objects and advantages will become apparent in the subsequent description in the specification.

Figure 1:
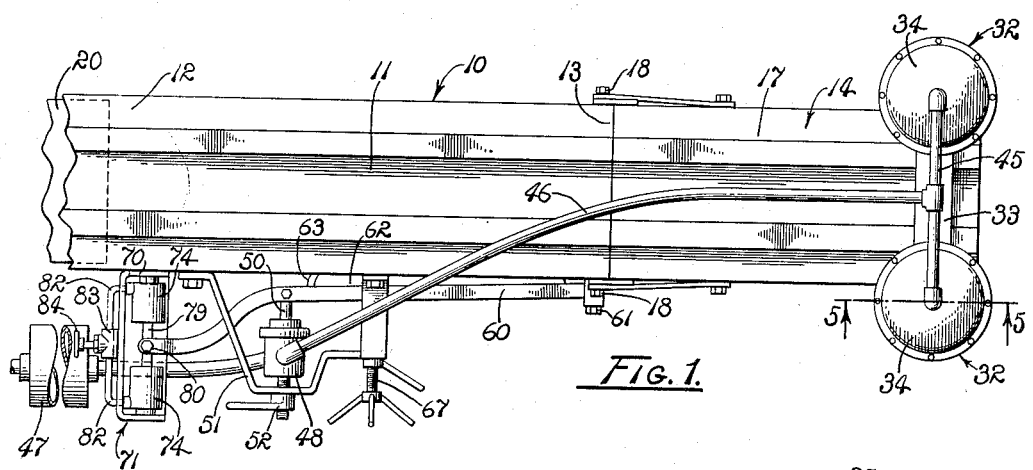
Fig. 1 is a top plan view of the delivery portion of a hay baler showing the apparatus of the present invention mounted thereon.
Figure 2:
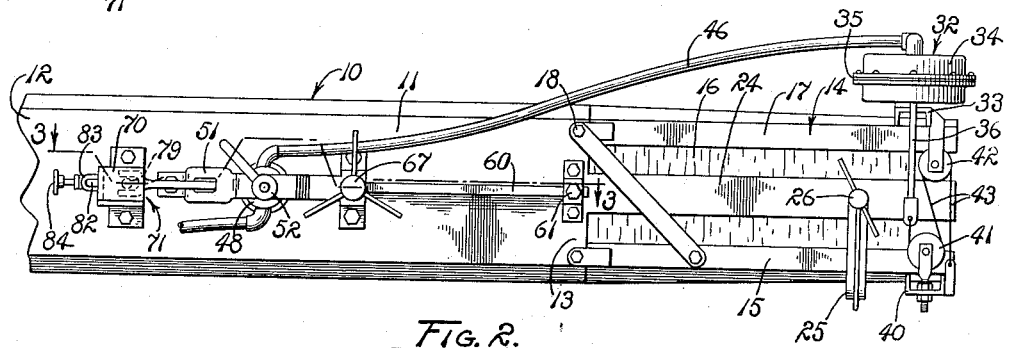
Fig. 2 is a side elevation of the structure shown in Fig. 1.
Figure 3:
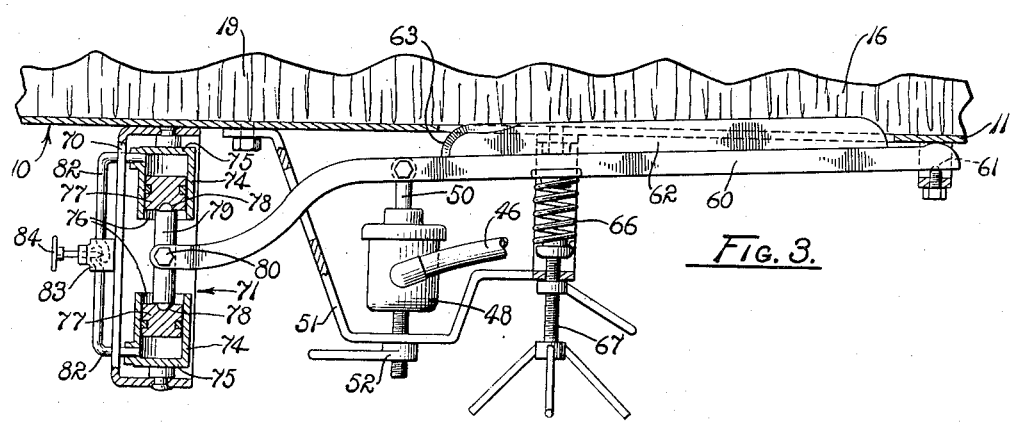
Fig. 3 is a horizontal section taken on line 3—3 of Fig. 2.
Figure 4:
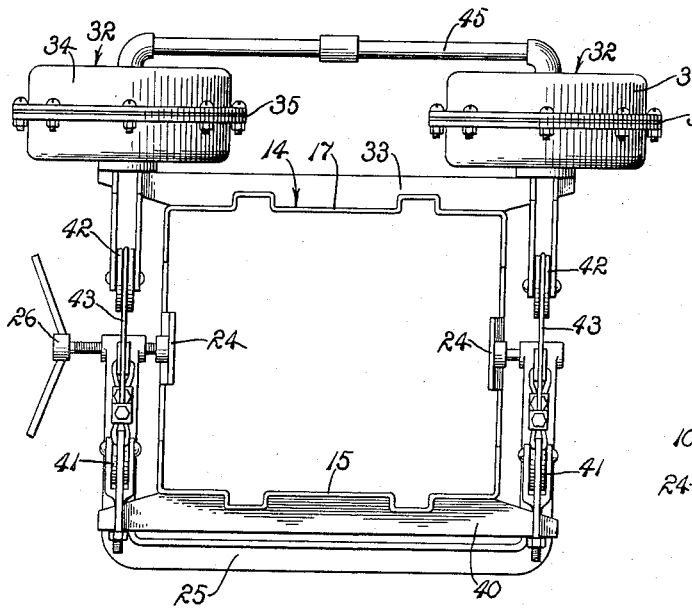
Fig. 4 is an elevation of the discharge end of the delivery portion of the baler.
Figure 5:
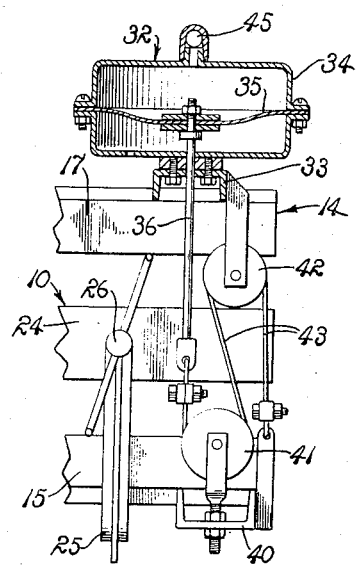
Fig. 5 is a section taken on line 5—5 of Fig. 1.
Figure 6:
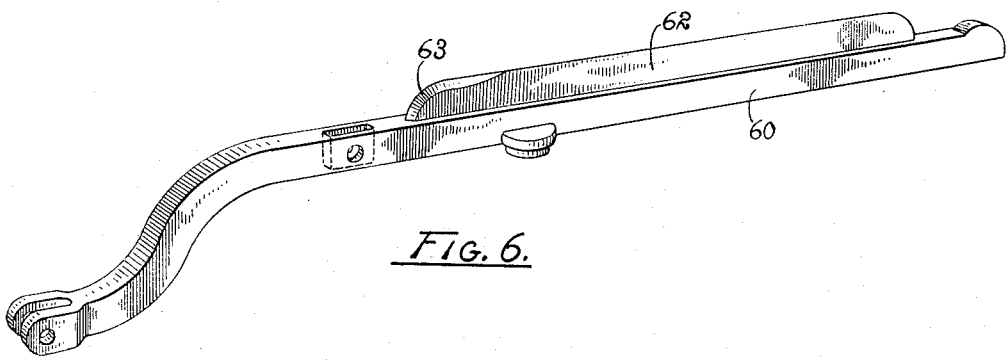
Fig. 6 is a somewhat enlarged perspective view of a control arm and blade utilized in the apparatus of the present invention illustrating a suitable density detecting device.

Referring in greater detail to the drawings:

The baling control of the present invention is illustrated and described in connection with the delivery portion of a fragmentarily represented baler 10 provided with an elongated hollow rectangular tubular bale case or chamber 11, having a forward end portion 12 and a rearward end portion 13. The forward end portion 12 defines an inlet opening and the rearward end portion 13 an outlet opening. A bale case extension 14 has a bottom 15 of channel form attached substantially rigidly to a lower portion of the bale case 11 at the rearward end portion 13 thereof adapted to support tied bales of hay 16 slidably thereon. The bale case extension 14 also includes an inverted channel form top member 17 which is located directly above and in juxtaposition to the bottom member 15. The top member 17 is hinged or pivoted at 18 to the upper rearward end portion 13 of the case for convergent-divergent positioning relative to the bottom 15 whereby adjustable resistance is offered to bales 16 discharged from the rearward end portion 13 of the case.

The bale case extension 14 described represents a convenient means for impeding the movement of completed bales of hay from the case so that the bales may be utilized as ramming backs against which successive charges of hay 19 are rammed in the formation of succeeding bales. A ram fragmentarily represented at 20 is reciprocated longitudinally of the case 11 and serves to compress successive charges of hay or the like into the case. In conventional balers, the ram is usually reciprocated approximately fifty times a minute during baling operations.

An elongated rectangular sheet metal resistor plate 24 is pivotally or flexibly attached to the rear edge of each side of the bale case 11 and extended rearwardly in substantial alignment therewith. The resistor plates are adapted to be adjustably positioned in predetermined spaced relation to offer base resistance to bale movement therebetween. A U-shaped bracket clamp 25 makes engagement with the outer sides of the resistor plates. A T-handle operated vise means 26 is provided whereby the U-clamp adjustably restrict the spacing of the plates. The structure described to this point is of well-known design and is intended to illustrate an operational environment for the present invention which is applied thereto for automatically regulating the relationship of the top member 17 of the bale case extension 14 to the stationary bottom member 15 to impose a selected and constant regulated resistance to the discharge of bales against which successive bales are rammed, superimposed upon the base resistance resulting from predetermined spacial limiting of the resistor plates 24. The device of the present invention may be employed in other bale-resisting mechanisms without departing from the spirit or the scope of the invention.

The means for regulating the spaced relationship of the top member 17 and bottom member 15 of the bale extension 14 conveniently takes the form of a powered control indicated generally by the reference numeral 32. A channel iron member 33 is weldably or otherwise attached transversely against the upper side of the top member 17 and is oppositely laterally extended therefrom. A vacuum responsive actuator 34 is mounted on each end of the channel member 33 in axially vertical position.

The actuators 34 conveniently employ generally cylindrical halves assembled in coaxial alignment to form a housing. A diaphragm 35 is mounted between the halves. As will subsequently become apparent, the upper half of each housing has the pressure therein controlled in response to density of compressed hay in the chamber 11 and the lower of the two portions is open to atmospheric pressure. A control rod 36 is connected centrally to the diaphragm, slidably mounted in the lower portion of each of the actuators 34, and extended downwardly adjacent to the side of the bale case extension 14.

A channel iron member 40 is secured transversely beneath the bottom member 15 of the bale case extension 14 and transversely extended oppositely therefrom. A sheave 41 is rotatably mounted on each end of the member 40. A second sheave 42 is rotatably mounted on the top member 17 at each side of the extension 14. A cable 43 is anchored to the bottom member 15 on each side of the extension, threaded through the second sheave 42 thereabove, threaded through the lower sheave 41 adjacent thereto, and connected to the lower end of the control 36 of the diaphragm mounted on the same side of the extension. The cable and sheaves serve to multiply the power of the vacuum operated actuators 34 and it will be apparent that other power controls and connections may be utilized without departing from the spirit or the scope of the present invention.

The actuators 34 are operated simultaneously and correspondingly by providing an interconnecting conduit 45 communicating with both of the upper halves of the actuators. An air hose 46 is connected to the conduit at one end and at its other end is connected to an accumulator tank 47. The accumulator tank is connected to the intake manifold of an internal combustion engine, not shown, or other suitable source of vacuum or reduced air pressure. A pressure regulating valve 48 is positioned in the hose 46 between the conduit 45 and the accumulator tank 47 in adjacent spaced relation to the case 11.

The valve 48 is of any suitable form having a predetermined closed position and being adapted for progressively increased opening to a predetermined fully opened position. A valve control rod 50 is slidably extended from the valve and serves by its longitudinal positioning to regulate the reduction of air pressure in the hose 46 and thus in the actuators 34 between the limits of atmospheric pressure and the reduced pressure in the accumulator tank 47. A bracket 51 is mounted on the bale case adjacent to the position of hay compression therein and serves to mount the valve 48 in adjacent spaced relation to the case with the control rod 50 thereof extended toward the case. The valve is preferably mounted in the bracket by screw-threaded means 52 for adjustable positioning relative to the case.

An elongated control arm 60 is pivotally mounted on the case 11, as at 61, in any suitable manner, and is extended longitudinally of the bale case 11 between the valve 48 and the case. The control rod 50 is pivotally connected to the control arm. An elongated blade 62 is provided on the arm 60 and has a sharpened edge 63 extended through a slot in the case disposed inwardly of the case and in the direction from which hay 19 is rammed in the case.

A spring 66 is mounted in the bracket 15 in engagement with the control arm 60 and adjustable means 67 preferably employed whereby the spring pressure against the arm may be regulated.

Forwardly of the valve 48, the control arm 60 is preferably offset away from the case 11. A mounting frame 70 is borne by the case and serves to hold a damper 71 which is coupled to the arm to eliminate sudden pulse movements thereof.

The damper includes a pair of substantially identical cylinders 74 having closed ends 75 and open ends 76 which are mounted in the frame 70 on opposite sides of the arm 60 with the open ends 76 juxtapositioned and the cylinders substantially axially aligned. A piston 77 is slidably mounted in each of the cylinders and provides a socket 78 therein. A connecting rod 79 has opposite ends fitted to the socket 78 and is connected between the pistons by filling the cylinders 74 between the pistons and their respectively adjacent closed ends 75 of the cylinders with any suitable hydraulic fluid. The extended end of the control arm 60 is preferably bifurcated and extended on opposite sides of the connecting rod 79. A pin 80 pivotally connects the bifurcated end of the arm and the connecting rod intermediate the pistons.

A conduit 82 interconnects the reservoirs of fluid in the opposite ends of the cylinders. A valve 83 or other means for limiting fluid flow between the cylinders is mounted in the conduit 82 and conveniently provides a manually accessible control wheel 84.

Operation

The operation of the device of the present invention is essentially similar to that described in the above identified copending application except for the utilization of the damper 71. Successive charges of hay 19 or other material are compressed in the case 11 by the ram 20 against a previously formed bale 16. As the hay is compressed in the case, the blade 62 rides therein under the urging of the spring 66. When the hay is excessively compressed the blade is urged outwardly from the case 11 and the arm 60 correspondingly pivoted outwardly from the case. When the hay is insufficiently compressed, the blade moves inwardly of the case in response to the adjustable compression of the spring 66 and the arm 60 correspondingly toward the case.

The valve 48 connected to the arm 60 regulates the effective vacuum applied to the actuators 34 so that as the blade moves inwardly of the case, the vacuum applied to the actuators is increased to pivot the top member 17 of the bale case extension 14 toward the bottom member and conversely, to reduce the vacuum to which the actuators are subjected when the blade is thrust outwardly from the case to reduce the resistance offered to bale discharge by the bale case extension.

As previously indicated, there is a tendency for the blade to move outwardly from the case as each successive charge of hay is rammed therein and to move inwardly of the case intermediate such charges. Such tendency was greatly minimized by the utilization of a sharpened edge 63 on the blade 62 but, as the blade became dulled, the tendency for pulse movement of the blade and arm was accentuated. Further, in bale control systems using other density detecting means such as a reciprocal plunger or star wheel rotated in compressed hay, there is an even greater tendency for the arm to be moved in successive pulses incident to periodic density detection and/or ramming of successive charges of hay.

The damper 71 of the present invention successfully overcomes the pulse tendency and while having particularly advantageous results when utilized in the structure defined employing a blade 62 having a sharpened edge 63, it is highly successfully employed in commercial embodiments in which the density of the hay is detected by an elongated blade that does not have a sharpened edge and even with other density detecting means such as those to which reference has been made. In the event hay is insufficiently compressed in the case 11, the spring 66 urges the arm 60, connecting rod 79, and pistons 77 toward the case. This increases the pressure of the hydraulic fluid in the cylinder adjacent to the case and exhausts fluid therefrom through the conduit 82 at a rate adjusted by means of the valve 83. The fluid passes into the opposite cylinder which during such operation constitutes a reservoir for excess fluid and a source of replacing fluid during the reverse operation.

Movement of the arm toward the case serves to increase the resistance to the discharge of the bale 16, in the manner previously described. If hay is excessively compressed in the case 11, the blade 62 and arm 60 are thrust outwardly of the chamber urging the connecting rod 79 and piston 77 away from the chamber. During this operation, hydraulic fluid is forced through the conduit 82 and valve 83 from the outer cylinder to the inner cylinder. It will be apparent that by proper adjustment of the valve 83 the rate of fluid flow therethrough can be so regulated that pulse or other frequent actuation of the valve 48 is reduced to insignificance while the described control system continues to operate effectively in controllably resisting the discharge of bales 16 so as to properly regulate hay density in newly formed bales in response to an everaging detection of the density of hay compression.

The device of the present invention has successfully overcome the difficulties previously described. It is economical to produce, durable in construction, conveniently adjusted to accommodate the compression and/or bale formation of a wide range of materials under varied environmental conditions, and by its commercial acceptance has demonstrated its ability successfully to provide fully automatic control of hay densities in baling apparatus.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices, systems, and apparatus.

Having described my invention, what I claim as new and desire to secure by Letters Patent is:

1. In a baling apparatus adapted to compress material into bales of automatically controlled density having a density detection means movable to and from material compressed in the apparatus in response to compression density, a damper connected to the detection means resistive to sudden movements of the detection means to and from the compressed material comprising a pair of juxtapositioned cylinders mounted in axial alignment adjacent to the detection means, a piston slidably mounted in each cylinder, means interconnecting the pistons and the detection means for corresponding movment, fluid substantially filling the cylinders inwardly of their respective pistons, and means providing restricted fluid communication between the cylinders at positions inwardly of their respective pistons.

2. In an automatic density control for hay presses having a bale chamber into which hay is compacted and through which hay is forced for discharge in bale form, means for adjustably resisting discharge of hay from the chamber whereby the extent of compression of hay in the chamber is adjustably controlled, means extensible into the chamber adapted to detect extent of compression of hay in the chamber, resilient means urging the detection means into the chamber, a control system interconnecting the detection means and the resisting means adapted to increase resistance to discharge of hay from the chamber in response to movement of the detection means into the chamber beyond a predetermined position and to reduce resistance to discharge of hay from the chamber in response to forcing of the detection means from the chamber beyond a predetermined position, and an adjustable damper connected to the detection means for controllably resisting sudden movements of the detection means into and outwardly of the chamber.

3. In a baling apparatus having a chamber providing an inlet for admitting material to be baled and an outlet for discharging baled material, means at the outlet for adjustably resisting discharge of baled material, means for compressing material in the chamber, detection means mounted on the chamber for reciprocal movement to and from the chamber at a position intermediate the inlet and the outlet engageable with material being compressed in the chamber to detect the density thereof, resilient means urging the detection means into the chamber, a control system interconnecting the detection means and the bale discharge resisting means for regulating resistance to bale discharge in proportion to extent of movement of the detection means into the chamber, and an adjustable damper connected to extent of movement of the detection means into the chamber, and an adjustable damper connected to the detection means for controllably resisting sudden movements of the detection means into and outwardly of the chamber.

4. In a baling apparatus adapted to compress material into bales of automatically controlled density having a ram successively reciprocated at a predetermined frequency for compressing material into bale form, means movable to and from material compressed by the ram in response to the density of compression thereof to detect the extent of compression, and means connected to the detection means adapted automatically to regulate the density of compression of the material by the ram; a damper connected to the detection means adapted to obviate movements of the detection means at frequencies as fast as the frequency of ram operation while accommodating movements thereof at slower frequencies comprising a pair of juxtapositioned cylinders mounted in axial alignment adjacent to the detection means, a piston slidably mounted in each cylinder, means interconnecting the pistons and the detection means for corresponding movement, fluid substantially filling the cylinders inwardly of their respective pistons, and means providing restricted fluid communication between the cylinders at positions inwardly of their respective pistons.

5. In a baling apparatus having a chamber in which material to be baled is compressed including an inlet opening for receiving material to be compressed into bale form and an outlet opening for discharging bales of the compressed material, means at the outlet opening for resisting discharge of bales therethrough to vary the density of the material compressed into bales in the chamber, density detection means mounted on the chamber intermediate the inlet opening and the outlet opening for reciprocal movement to and from material compressed in the chamber and urged from the chamber by said material, resilient means urging the detection means into the chamber in opposition to material compressed therein, an automatic control system interconnecting the detection means and the bale resisting means adapted to increase resistance to bale discharge in response to movement of the detection means into the bale chamber beyond a predetermined position and to reduce resistance to bale discharge in response to movement of the detection means outwardly of the chamber beyond the predetermined position, and an adjustable hydraulic damper connected to the detection means for controllably resisting sudden movements of the detection means into and outwardly of the chamber.

6. In an automatic density control for a hay press having an elongated bale chamber in which hay is compacted at one end and through which the hay is forced for discharge in baled form from the opposite end, said discharge end of the bale chamber being constrictable and distensible to vary the cross-sectional area thereof, an elongated control arm pivotally mounted longitudinally of the bale chamber for reciprocal movement to and from the chamber, an elongated blade mounted longitudinally on the control arm and having a longitudinal edge extended into the bale chamber at a position adjacent to which the hay is compacted in the chamber, means resiliently urging the arm and the blade inwardly of the chamber, means operably connected to the control arm having controlling connection to the discharge end of the bale chamber for varying the cross-sectional area of the bale chamber in response to movement of the control arm and blade to and from the bale chamber, a cylinder mounted on the bale chamber adjacent to the extended end of the control arm, a piston slidably mounted in the cylinder, a connecting rod pivotally inter-connecting the piston and the extended end of the arm, hydraulic fluid substantially filling the cylinder, means for receiving excess fluid when the piston moves inwardly of the cylinder and for supplying fluid to the cylinder when the piston moves outwardly thereof, and means restricting fluid flow to and from the cylinder.

7. The apparatus of claim 6 in which the blade has a sharpened hay cutting edge disposed within the chamber in the direction from which hay is forced through the chamber.

8. In a baling apparatus having a chamber in which material to be baled is compressed including an inlet opening for receiving material to be compressed into bale form and an outlet opening for discharging bales of the compressed material, means at the outlet opening for resisting discharge of bales therethrough to vary the density of the material compressed into bales in the chamber, density detection means mounted on the chamber intermediate the inlet opening and the outlet opening for reciprocal movement to and from material compressed in the chamber and urged from the chamber by said material, resilient means urging the detection means into the chamber in opposition to material compressed therein, and an automatic control system interconnecting the detection means and the bale resisting means adapted to increase resistance to bale discharge in response to movement of the detection means into the bale chamber beyond a predetermined position and to reduce resistance to bale discharge in response to movement of the detection means outwardly of the chamber beyond the predetermined position; a pair of juxtapositioned cylinders mounted in substantial axial alignment adjacent to the detection means, a piston slidably mounted in each of the cylinders, a conduit interconnecting the cylinders at positions inwardly of their respective pistons, hydraulic fluid substantially filling the cylinders inwardly of their respective pistons and the conduit, a valve positioned in the conduit adapted to regulate fluid flow therethrough between the cylinders, a connecting rod interconnecting the pistons in predetermined spaced relation, and means connecting the detection means to the connecting rod whereby speed of movement of the detection means to and from the chamber is limited by regulated rate of fluid flow between the cylinders.

9. In an automatic density control for hay presses having an elongated bale chamber in which hay is compacted at one end and through which the hay is forced for discharge in bale form from the opposite end, an elongated control arm pivotally mounted longitudinally of the bale chamber for movement to and from the chamber and having an end extended externally adjacent to the compacting end of the chamber, an elongated blade mounted longitudinally on the control arm and having a longitudinal edge extending into the bale chamber at a position adjacent to which the hay is compacted in the chamber, resilient means urging the arm and the blade inwardly of the chamber, a bracket mounted on the bale chamber in arched relation over the extended end of the control arm, a regulating valve connected to the extended end of the control arm and to the bracket opposite to the bale chamber from the control arm, said valve being adjustably positioned on the bracket in spaced relation to the bale chamber, a control system including the valve connected to the discharge end of the bale chamber and varying the cross-sectional area of the bale chamber in response to pivotal movement of the control arm, a pair of juxtapositioned substantially axially aligned cylinders mounted on opposite sides of the extended end of the control arm, one thereof being mounted between the control arm and the chamber and the other thereof opposite to the bale chamber from the arm, each of the cylinders having a closed end portion and an opposite open end portion with the open end portions disposed toward the control arm, a piston slidably mounted in each of the cylinders, each of the pistons having a socket formed therein disposed toward the control arm, a conduit interconnecting the cylinders at positions inwardly from their respective pistons, a valve mounted in the conduit, hydraulic fluid substantially filling the conduit and the cylinders between the closed ends thereof and the pistons, a connecting rod having opposite ends rested in the sockets of the pistons, and means pivotally connecting the connecting rod to the extended end of the control arm.

10. The apparatus of claim 9 in which the blade has a sharpened hay cutting edge disposed within the chamber in the direction in which hay is forced through the chamber.

References Cited in the file of this patent

UNITED STATES PATENTS

| | | |
|---|---|---|
| 396,108 | Nickerson | Jan. 15, 1889 |
| 2,040,262 | Kruckenberg et al. | May 12, 1936 |
| 2,576,784 | Dodds et al. | Nov. 27, 1951 |
| 2,613,590 | Graybill | Oct. 14, 1952 |